US010670434B2

(12) United States Patent
Cheng et al.

(10) Patent No.: US 10,670,434 B2
(45) Date of Patent: Jun. 2, 2020

(54) METHOD FOR DETECTING ABNORMALITY OF FLUID FILTER AND FLUID FILTER ABNORMALITY DETECTING SYSTEM

(71) Applicant: Automotive Research & Testing Center, Changhua County (TW)

(72) Inventors: Sheng-Chieh Cheng, Changhua County (TW); Yong-Yuan Ku, Changhua County (TW); Ke-Wei Lin, Changhua County (TW); Chia-Jui Chiang, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 461 days.

(21) Appl. No.: 15/375,157

(22) Filed: Dec. 11, 2016

(65) Prior Publication Data

US 2018/0161709 A1    Jun. 14, 2018

(51) Int. Cl.
| | |
|---|---|
| *B01D 35/143* | (2006.01) |
| *B01D 35/00* | (2006.01) |
| *G01F 1/34* | (2006.01) |
| *G01L 13/00* | (2006.01) |
| *B01D 29/60* | (2006.01) |

(52) U.S. Cl.
CPC ............ *G01F 1/34* (2013.01); *B01D 29/603* (2013.01); *B01D 29/606* (2013.01); *B01D 35/005* (2013.01); *B01D 35/143* (2013.01); *B01D 2201/54* (2013.01)

(58) Field of Classification Search
CPC .. B01D 29/603; B01D 29/606; B01D 35/005; B01D 35/143; B01D 35/00; B01D 35/1435; B01D 2201/54; G01L 13/00; G01F 1/34

USPC .......................................................... 210/85
See application file for complete search history.

(56) References Cited

U.S. PATENT DOCUMENTS

| | | | | |
|---|---|---|---|---|
| 2011/0054811 A1* | 3/2011 | Contini | ............... | B01D 35/143 702/47 |
| 2012/0074069 A1* | 3/2012 | Ripley | ............... | B01D 35/1435 210/741 |

FOREIGN PATENT DOCUMENTS

| | | |
|---|---|---|
| CN | 103321801 A | 9/2013 |
| CN | 104727895 A | 6/2015 |
| CN | 105604638 A | 5/2016 |

* cited by examiner

*Primary Examiner* — Robert Clemente
*Assistant Examiner* — Akash K Varma
(74) *Attorney, Agent, or Firm* — CKC & Partners Co., LLC (57) ABSTRACT

A method for detecting an abnormality of a fluid filter includes: detecting a flow rate of a fluid in the fluid filter; detecting a pressure difference in the fluid filter; constructing an operating model of the fluid filter in accordance with a geometry of the fluid filter, a physical characteristic of the fluid, a porosity of the fluid filter, an impurity density, the flow rate and the pressure difference; obtaining an initial impurity accumulative quantity through the operating model; estimating a time dependent impurity accumulative status through a Kalman filter in accordance with the initial impurity accumulative quantity and the pressure difference; obtaining an impurity accumulative quantity in an estimated time in accordance with the time dependent impurity accumulative status, and then comparing the impurity accumulative quantity with a pre-determined value to determine if the fluid filter operates normally.

6 Claims, 11 Drawing Sheets

METHOD FOR DETECTING ABNORMALITY OF FLUID FILTER AND FLUID FILTER ABNORMALITY DETECTING SYSTEM

BACKGROUND

Technical Field

The present disclosure relates to a method for detecting an abnormality of a fluid filter and a fluid filter abnormality detecting system. More particularly, the present disclosure relates to a method and a system that are capable of dynamically estimating the Impurity accumulative quantity.

Description of Related Art

A fluid filter is used to filter the impurities. Two types of fluid filter are commonly used, liquid filters and gas filters. Many kinds of filters such as air filters, fuel filters, lubricating oil filters, gearbox oil filters and air-condition filters are commonly equipped in a vehicle. Diesel cars are taken more seriously owing to the requirements on energy saving and environmental protection. A rail diesel injection system is commonly used in an engine of the diesel car, thus a high oil injection pressure and a high atomization effect are required to operate the rail diesel injection system. Therefore, a fuel filter with high precision and high efficiency is particularly important in suck kind of rail diesel injection system. The fuel filter is used to filter the impurities in a fuel system, and the impurities may come from the purity of the oil, the cleanliness of the oil tank or the precipitates of the oil.

In general, the impurities in the fluid filter are filtered through a filter cartridge. Since the accumulation of the impurities is time dependent, the fluid filer will be gradually clogged up with the using time, thereby reducing the flow rate and the quality of the oil. Therefore, the fluid filter should be replaced periodically. However, driving situations, oil types, oil quality and usage environments are varied with different vehicles, thereby increasing the difficulty of estimating the time of replacing the clogged fluid filter. For example, the maintenance cost will be increased when replacing the clogged fluid filer too early or the failure rate will be increased when replacing the clogged fluid filter too late.

Conventionally the clogging of the fluid filter is determined by a pressure difference between a fluid inlet and a fluid outlet of the fluid filter, and then a warning mechanism is actuated. If the flow rate of the fluid is stable, the aforementioned method is useful; however, commonly the vehicle is moving dynamically, and the flow rate of the fluid is instable, thereby causing the instability of the pressure difference. The instability of the pressure difference will cause an inaccurate estimation on the time to replace the clogged fluid filter.

Therefore, an accurate estimation on the time to replace the clogged fluid filter is fairly important to ensure the vehicle s moving under a high efficiency and a safety condition. Accordingly, there is a need to develop a method and a system that are capable of accurately estimating if the fluid filter operates normally and instantly informing the user.

SUMMARY

According to one aspect of the present disclosure, a method for detecting an abnormality of a fluid filter is provided. The method includes: detecting a flow rate of a fluid in the fluid filter; detecting a pressure difference in the fluid filter, constructing an operating model of the fluid filter in accordance with a geometry of the fluid filter, a physical characteristic of the fluid, a porosity of the fluid filter, an impurity density, the flow rate and the pressure difference; obtaining an initial impurity accumulative quantity through the operating model; estimating a time dependent impurity accumulative status through a Kalman filter in accordance with the initial impurity accumulative quantity and the pressure difference; obtaining an impurity accumulative quantity in an estimated time in accordance with the time dependent impurity accumulative status, and then comparing the impurity accumulative quantity with a pre-determined value to determine if the fluid filter operates normally.

According to another aspect of the present disclosure, a fluid filter abnormality detecting system is provided. The system includes a fluid filter, a flow detector, a pressure detector, an analyzer, a Kalman filter and a processor. The fluid filter has a fluid flowed therein. The flow detector detects a flow rate of the fluid. The pressure detector detects a pressure difference in the fluid fitter. The analyzer constructs an operating model of the fluid filter in accordance with a geometry of the fluid filter, a physical characteristic of the fluid, a porosity of the fluid filter, an impurity density, the flow rate and the pressure difference and obtains an initial impurity accumulative quantity. The Kalman filter estimates a time dependent impurity accumulative status in the fluid filter in accordance with the initial impurity accumulative quantity and an initial pressure difference. The processor obtains an impurity accumulative quantity in an estimated time in accordance with the time dependent impurity accumulative status, and then comparing the impurity accumulative quantity with a pre-determined value for determining if the fluid filter operates normally.

BRIEF DESCRIPTION OF THE DRAWINGS

The present disclosure can be more fully understood by reading the following detailed description of the embodiment, with reference made to the accompanying drawings as follows.

DETAILED DESCRIPTION

It is a purpose of the present disclosure to provide a method for detecting an abnormality of a fluid filter. The method is executed in accordance with a measured flow rate and a measured pressure difference as well as an operating model of the fluid filter constructed by combining parameters such as a geometry of the fluid filter, a physical characteristic of the fluid, a porosity of the fluid filter and an impurity density. An impurity accumulative quantity can be obtained through the operating model, and a time dependent impurity accumulative quantity can be estimated using a Kalman filter. Therefore, the method of the present disclosure has high accuracy.

Figure 1:
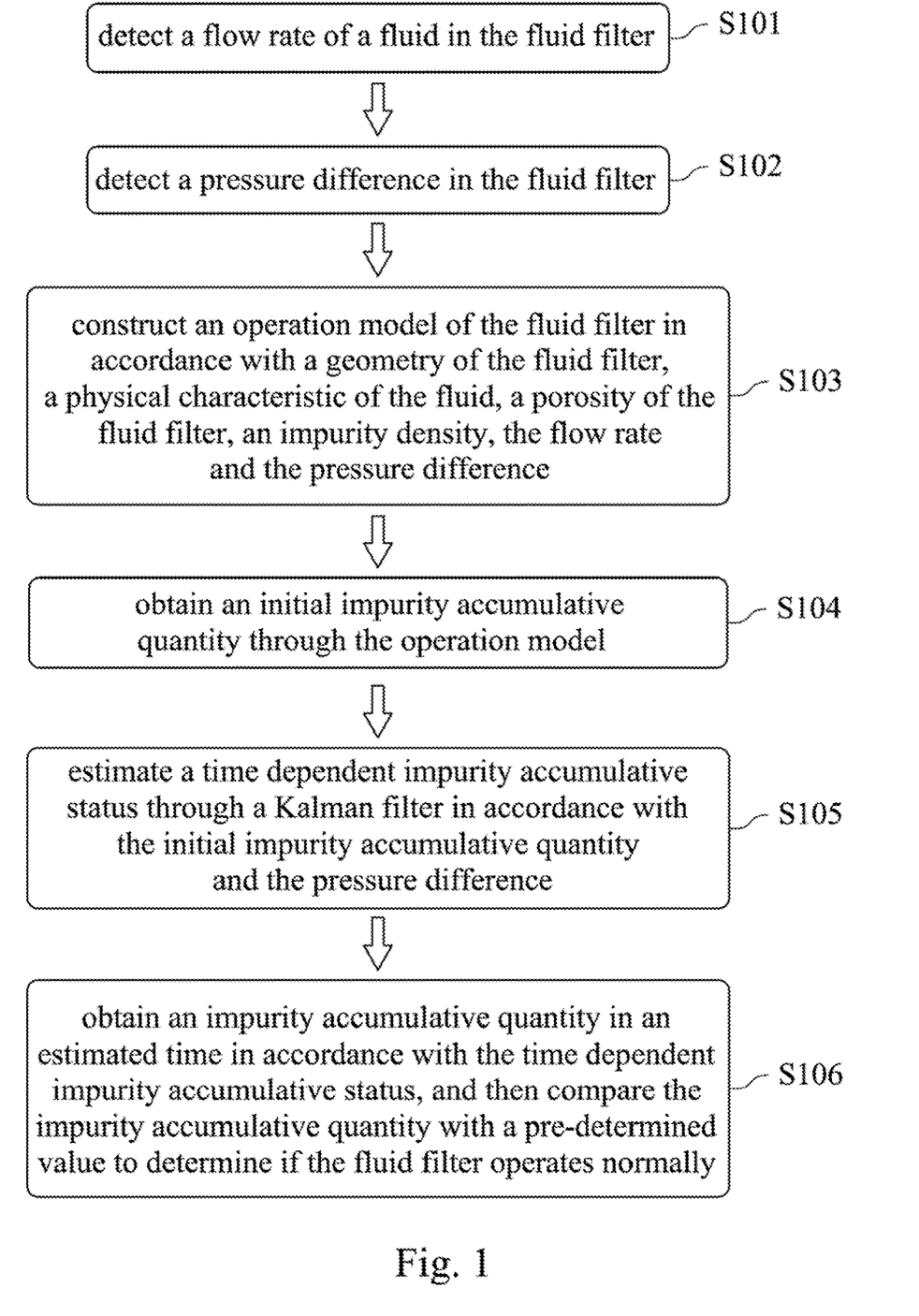
FIG. 1 is a flow chart showing a method for detecting an abnormality of a fluid filter according to one embodiment of the present disclosure.

FIG. 1 is a flow chart showing a method for detecting an abnormality of a fluid filter according to one embodiment of the present disclosure. The method includes the following steps.

A step S101 for detecting a flow rate of a fluid in the fluid filter.

A step S102 for detecting a pressure difference in the fluid filter.

A step S103 for constructing an operating model of the fluid filter in accordance with a geometry of the fluid filter, a physical characteristic of the fluid, a porosity of the fluid filter, an impurity density, the flow and the pressure difference.

A step 104 for obtaining an initial impurity accumulative quantity through the operating model.

A step S105 for estimating a time dependent impurity accumulative status through a Kalman filter in accordance with the initial impurity accumulative quantity and the pressure difference.

A step S106 for obtaining an impurity accumulative quantity in an estimated time in accordance with the time dependent impurity accumulative status, and then comparing the impurity accumulative quantity with a pre-determined value to determine if the fluid filter operates normally.

Figure 2:
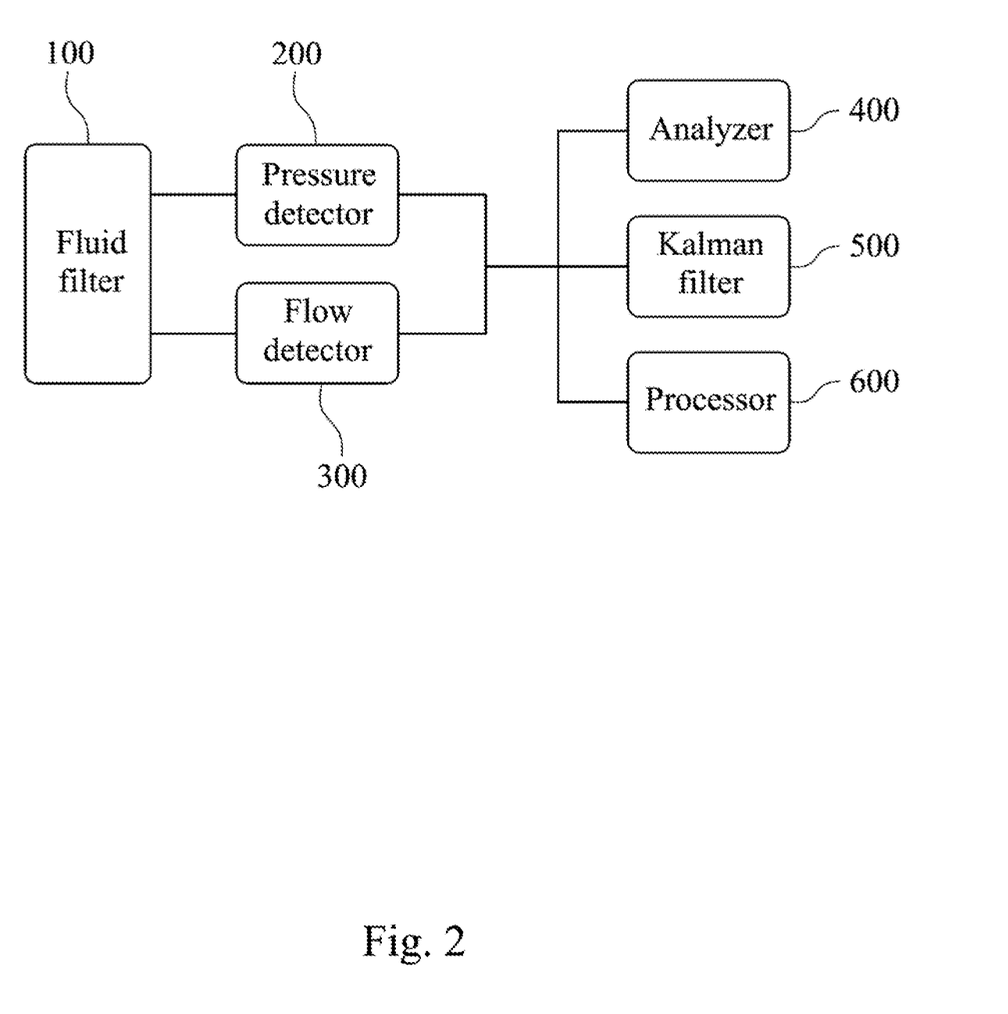
FIG. 2 is a schematic diagram showing a fluid filter abnormality detecting system according to one embodiment of the present disclosure.
Figure 3:
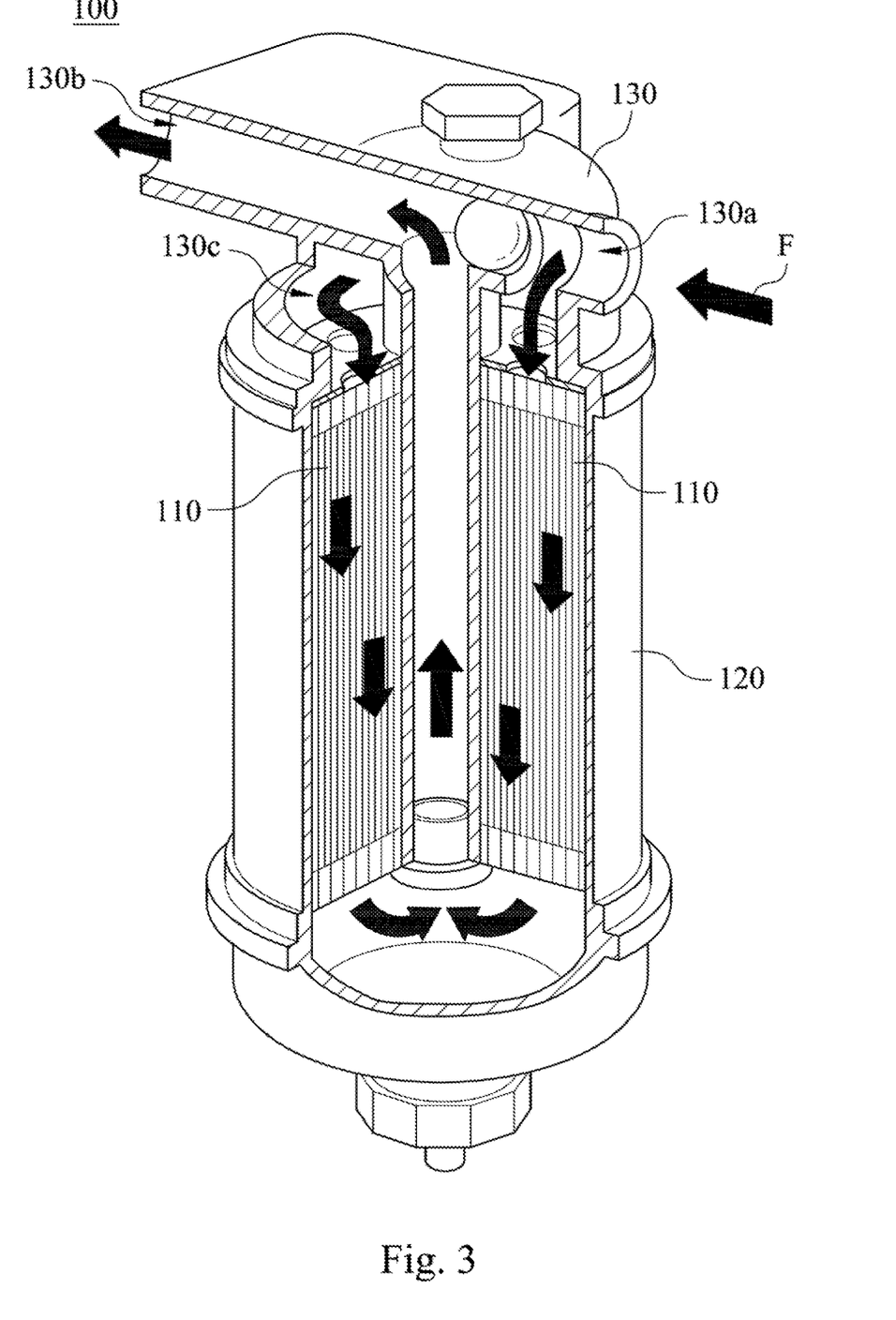
FIG. 3 shows an operation status of the fluid filter of FIG. 2.

In one embodiment, the present disclosure provides a fluid filter abnormality detecting system utilizing the aforementioned method. FIG. 2 is a schematic diagram showing a fluid filter abnormality detecting system according to one embodiment of the present disclosure. FIG. 3 shows an operation status of the fluid filter 100 of FIG. 2. The fluid filter abnormality detecting system includes a fluid filter 100, a pressure detector 200, a flow detector 300, an analyzer 400, a Kalman filter 500 and a processor 600.

In FIG. 3, a fluid F flows into a fluid inlet 130a of a one-way valve 130 and is filtered by a filter cartridge 110. In the embodiment, the filter cartridge 110 is a cylinder, therefore the fluid F partially flows through an annular channel 130c then into the filter cartridge 110 for obtaining a complete filtering effect. After the filtering, the fluid F flows out from a fluid outlet 130b of the one-way valve 130.

The flow detector 300 is used for detecting a flow rate of the fluid F in the fluid filter 100. In general, the flow detector 300 is factory-equipped in a land vehicle. Thus the flow detector 300 is not needed to be additionally equipped, and the cost can be reduced. Furthermore, in addition to the land vehicle such as cars or motorcycles, the fluid filter 100 can also be equipped in a navigation vehicle or an air vehicle.

The pressure detector 200 is used to detect a pressure difference in the fluid filter 100. The pressure difference is generated when the fluid F flows into the fluid inlet 130a and flows out from the fluid outlet 130b.

The analyzer 400 receives parameters such as the flow rate and the pressure difference of the fluid F, a geometry of the fluid filter 100, physical characteristics of the fluid F, a porosity of the fluid filter 100 and an impurity density to construct an operating model of the fluid filter 100 and obtain an initial impurity accumulative quantity in accordance with the real conditions.

The Kalman filter 500 is used to estimate a time dependent impurity accumulative status in the fluid filter 100 in accordance with the initial impurity accumulative quantity and an initial pressure difference.

The processor 600 obtains an impurity accumulative quantity in an estimated time in accordance with the time dependent accumulative impurity status, and then compares the impurity accumulative quantity with a pre-determined value for determining if the fluid filter 100 operates normally. In one example, a warning sound, a warning light or a warning message is generated when the operation of the fluid filter 100 is determined as abnormal.

The aforementioned analyzer 400 and the processor 600 can be referred as a computer device with logical operation functionality, and the computer device has a non-stationary storage media for storing required software programs. In other examples, the analyzer 400 and the processor 600 can be integrated to a multi-functional computer device or a multi-functional chip to reduce the volume of the whole device.

The aforementioned fluid F can be a fuel oil, an engine oil or an automatic transmission oil. In possible examples, any kinds of oils that require to be filtered through the fluid filter 100 can be applied to the method and the system of the present disclosure.

The aforementioned parameter pressure difference includes an empty shell pressure difference, a filter cartridge pressure difference and an impurity pressure difference. The porosity includes an empty shell porosity, a filter cartridge porosity and an impurity porosity. The geometry of the fluid filter includes a cross-sectional area of the fluid filter, an empty shell thickness, a filter cartridge thickness and an impurity thickness. The physical characteristic of the fluid includes a viscosity coefficient of the fluid F.

The meaning of each of the aforementioned parameters as well as how the operating model of the fluid filter 100 constructed are described in the following paragraphs. First, when the fluid F flows through the fluid filter 100, the flow behaviors can be expressed as the following equations:

$$\Delta P = \Delta P_{box} + \Delta P_{filter} + \Delta P_p; \qquad (1)$$

$$\Delta P_{box} = \frac{\mu \cdot Q \cdot L_b}{\kappa_b \cdot A}; \qquad (2)$$

$$\Delta P_{filter} = \frac{\mu \cdot Q \cdot L_f}{\kappa_f \cdot A}; \qquad (3)$$

-continued $$\Delta P_p = \frac{\mu \cdot Q \cdot L_p}{\kappa_p \cdot A};\qquad(4)$$

$$L_p = \frac{m}{A \cdot \rho_p};\qquad(5)$$

where m is an impurity accumulative quantity, ΔP is a pressure difference, μ is a viscosity coefficient of the fluid, Q is a flow rate, A is a cross-sectional area of the fluid filter, $\kappa_b$ is an empty shell porosity, $\kappa_f$ is a filter cartridge porosity, $\kappa_p$ is an impurity porosity, $\rho_p$ is an impurity density, $L_b$ is an empty shell thickness, $L_f$ is a filter cartridge thickness, $L_P$ is an impurity thickness, $\Delta P_{box}$ is an empty shell pressure difference, $\Delta P_{filter}$ is a filter cartridge pressure difference, $\Delta P_P$ is an impurity pressure difference.

Combining the aforementioned equations (1) to (5), an equation (6) can be obtained:

$$m = \frac{k_p A^2 \rho_P \Delta P}{\mu Q} - \frac{k_p A \rho_p L_b}{k_b} - \frac{k_p A \rho_p L_f}{k_f}.\qquad(6)$$

The equation (6) is the operating model of the fluid filter 100. In other word, the impurity accumulative quantity m can be used to represent an impurity accumulative status when operating the fluid filter 100. It also should be mentioned that the accumulation of the impurity is occurred when the fluid F flows through the shell 120 and the filter cartridge 110 of the fluid F. Therefore, different parameters of an empty shell state, a filter cartridge state and an Impurity state should be taken into consideration. Therefore, the parameters such as the empty shell porosity $\kappa_b$, the filter cartridge porosity $\kappa_f$, the impurity porosity $\kappa_p$, the empty shell thickness $L_b$, the filter cartridge thickness $L_f$, the impurity thickness $L_P$, the empty shell pressure difference $\Delta P_{box}$, the filter cartridge pressure difference $\Delta P_{filter}$ and the impurity pressure difference $\Delta P_P$ should be all taken into consideration.

Furthermore, a fluid only can flow into a hole or a pore communicated with the hole. Therefore, the porosity is defined by a ratio between the volume of the hole in a material and the volume of the whole material. Higher porosity indicates that a fluid in a material is higher, thus the porosity is an important parameter to evaluate a performance of a fluid. The empty shell porosity $\kappa_b$ is generally provided by the manufacturing company of the fluid filter 100. However, if the empty shell porosity $\kappa_b$ is not available, the present disclosure provides a method that obtaining $\Delta P_{box}=f(Q)$ through executing a quadratic regression analysis to a plurality of flow rates of the fluid F, then the aforementioned equation (2) can be used to obtain the empty shell porosity $\kappa_b$. In other word, the variance of the empty shell pressure difference $\Delta P_{box}$ is affected by the flow rate of the fluid F, and the relationship between the flow rate of the fluid F and a pressure difference match a quadratic equation. Similarly, the filter cartridge porosity $\kappa_f$ and the impurity porosity $\kappa_p$ can be obtained through the equations (3) and (4) respectively using the similar method.

Figure 4:
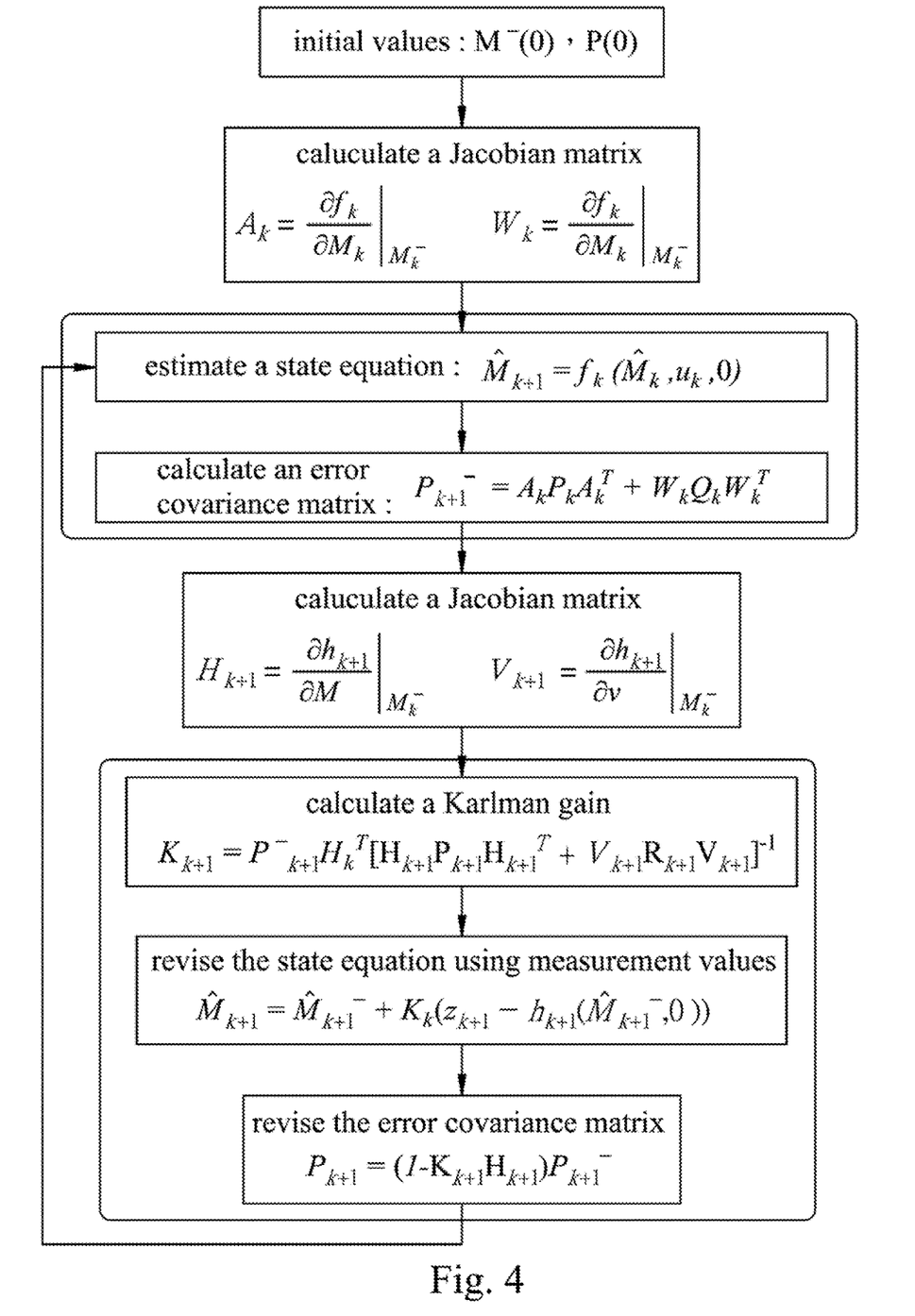
FIG. 4 is a schematic diagram showing how a Kalman filter is operated to estimate a time dependent impurity accumulative quantity in a fluid filter.

Through the equation (6), an initial impurity accumulative quantity can be obtained. However, for estimating an impurity accumulative quantity in a pre-determined time, an estimation method should be introduced. FIG. 4 is a schematic diagram showing how the Kalman filter 500 is operated to estimate a time dependent impurity accumulative quantity in the fluid filter 100.

In FIG. 4, an initial impurity accumulative quantity and an initial pressure difference obtained through the equation (6) is introduced into the Kalman filter 500. And then executing the following steps: calculating a Jacobian matrix; estimating a state equation; calculating an error covariance matrix; calculating a Jacobian matrix; calculating a Kalman gain; revising the state equation with measurement values; revising the error covariance matrix, then repeatedly introducing the revised state equation and the revised error covariance matrix into the original state equation and the error covariance matrix. Finally, the time dependent impurity accumulative status in the fluid filter 100 can be obtained.

Figure 5A:
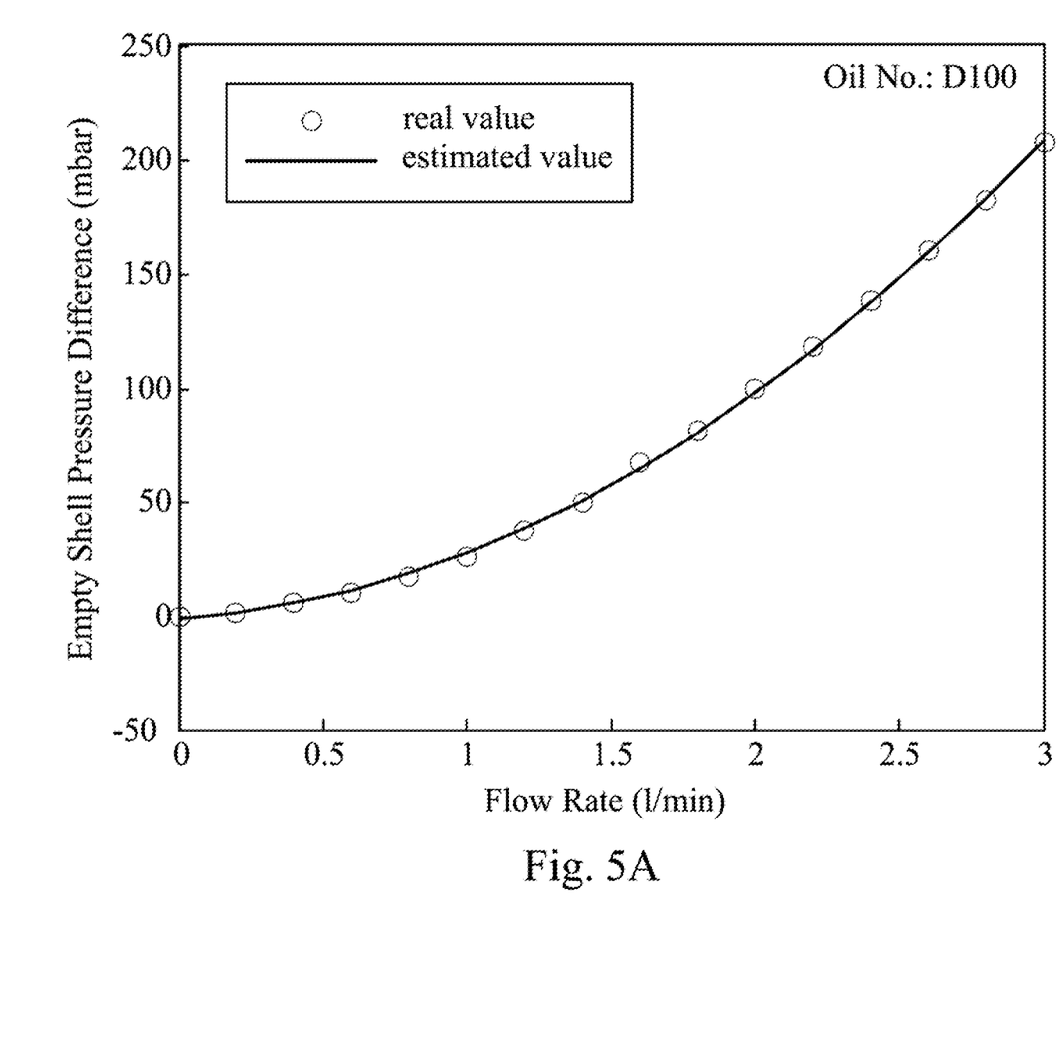
FIG. 5A is a flow dependent diagram showing a comparison between an estimated pressure difference and a real pressure difference of a fluid (Oil No. D100)
Figure 5B:
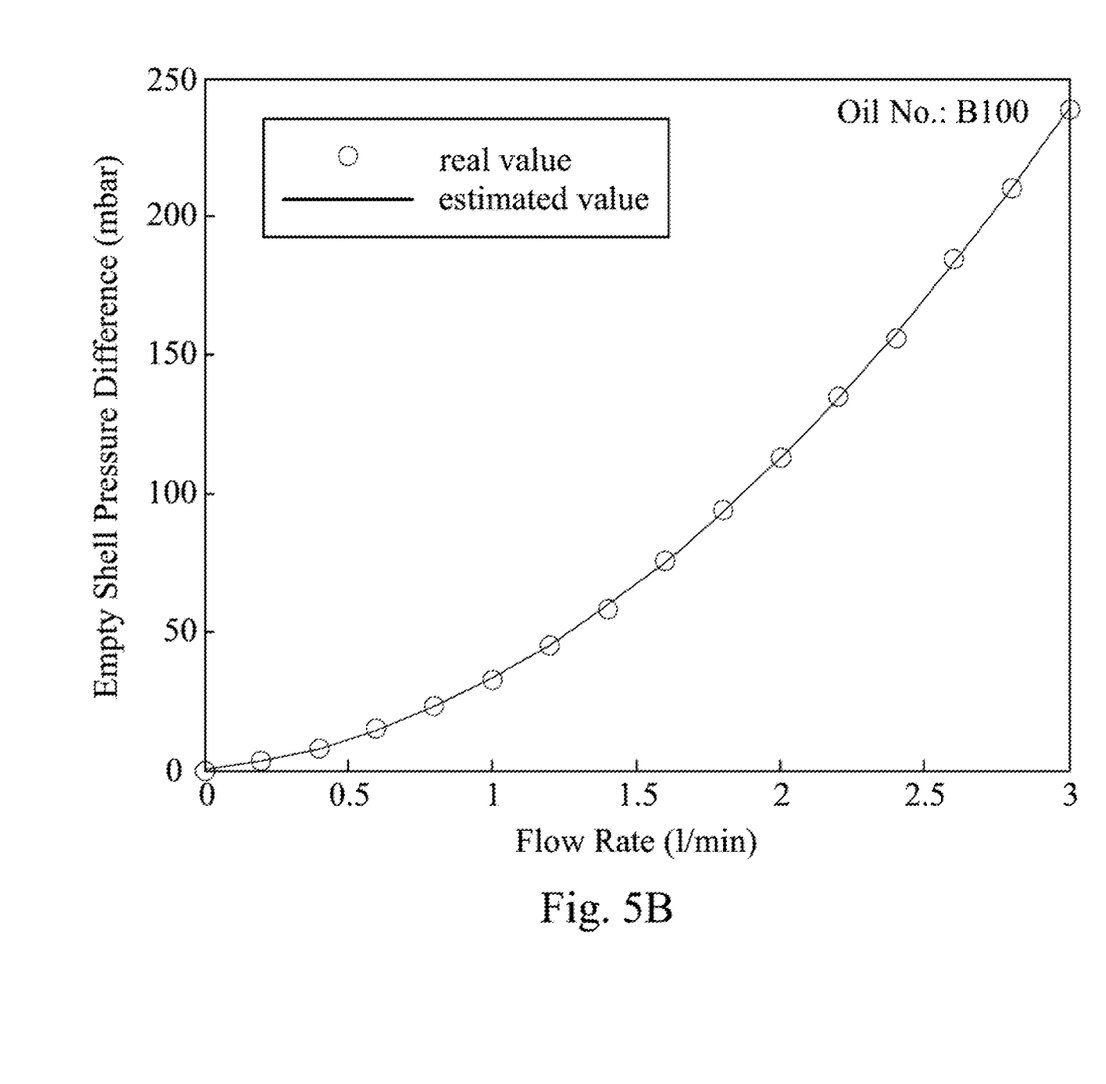
FIG. 5B Is a flow dependent diagram showing a comparison between an estimated pressure difference and a real pressure difference of a fluid (Oil No. B100)

FIG. 5A is a flow dependent diagram showing a comparison between an estimated pressure difference and a real pressure difference of a fluid (Oil No. D100); FIG. 5B is a flow dependent diagram showing a comparison between an estimated pressure difference and a real pressure difference of a fluid (Oil No. B100).

Form FIGS. 5A and 5B, it is shown that the estimated empty shell pressure difference $\Delta P_{box}$ varied with the flow rate is match to the real empty shell pressure difference $\Delta P_{box}$ varied with the flow rate when using the quadratic regression analysis performed to a plurality of flow rates of the fluid F. It is also shown that the method has a wide application range and can be applied to different kinds of fluids.

Figure 6:
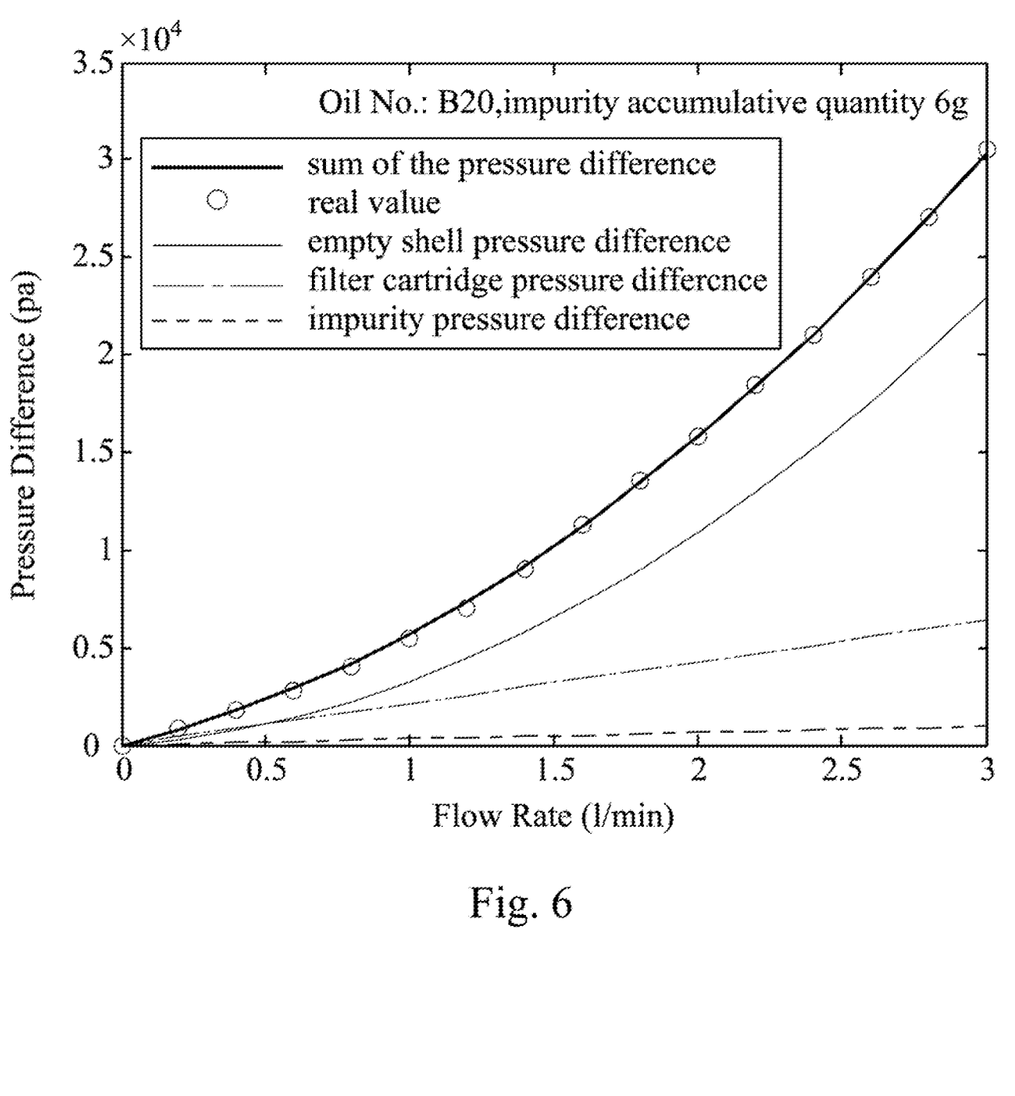
FIG. 6 is a flow dependent diagram showing a comparison between an estimated pressure difference and a real pressure difference of a fluid (Oil No. B20) having impurities.

FIG. 6 is a flow dependent diagram showing a comparison between an estimated pressure difference and a real pressure difference of a fluid (Oil No. B20) having impurities.

The following TABLE 1 shows percentage errors between the real and estimated pressure differences of different kinds of fluids F (Oils) in different states (with impurity accumulation or without impurity accumulation) and different flow rates of the fluid F. It is clearly shown that the percentage errors are all within 10%.

TABLE 1

| Oil No. | flow rate (l/min) | | | | | |
|---|---|---|---|---|---|---|
| | 1 | 1.4 | 1.8 | 2.2 | 2.6 | 3 |
| D100 | 3.13% | −2.92% | −3.09% | −0.24% | 1.17% | −2.97% |
| B2 | −0.52% | 6.44% | 7.37% | 8.45% | 7.42% | 6.21% |
| B5 | 9.45% | 1.18% | −0.91% | 1.04% | −6.59% | −6.57% |
| B20 | 3.57% | −1.13% | −7.10% | −2.08% | −8.07% | −9.05% |
| B100 | 9.42% | 5.75% | −4.44% | −8.15% | −9.07% | −9.79% |
| B20 (with 6 g impurity accumulation) | 2.67% | 3.78% | 1.15% | 2.68% | 2.63% | −1.80% |
| B100 (with 6 g impurity accumulation) | 8.05% | 8.55% | 2.75% | 0.08% | −0.46% | −3.88% |

Figure 7:
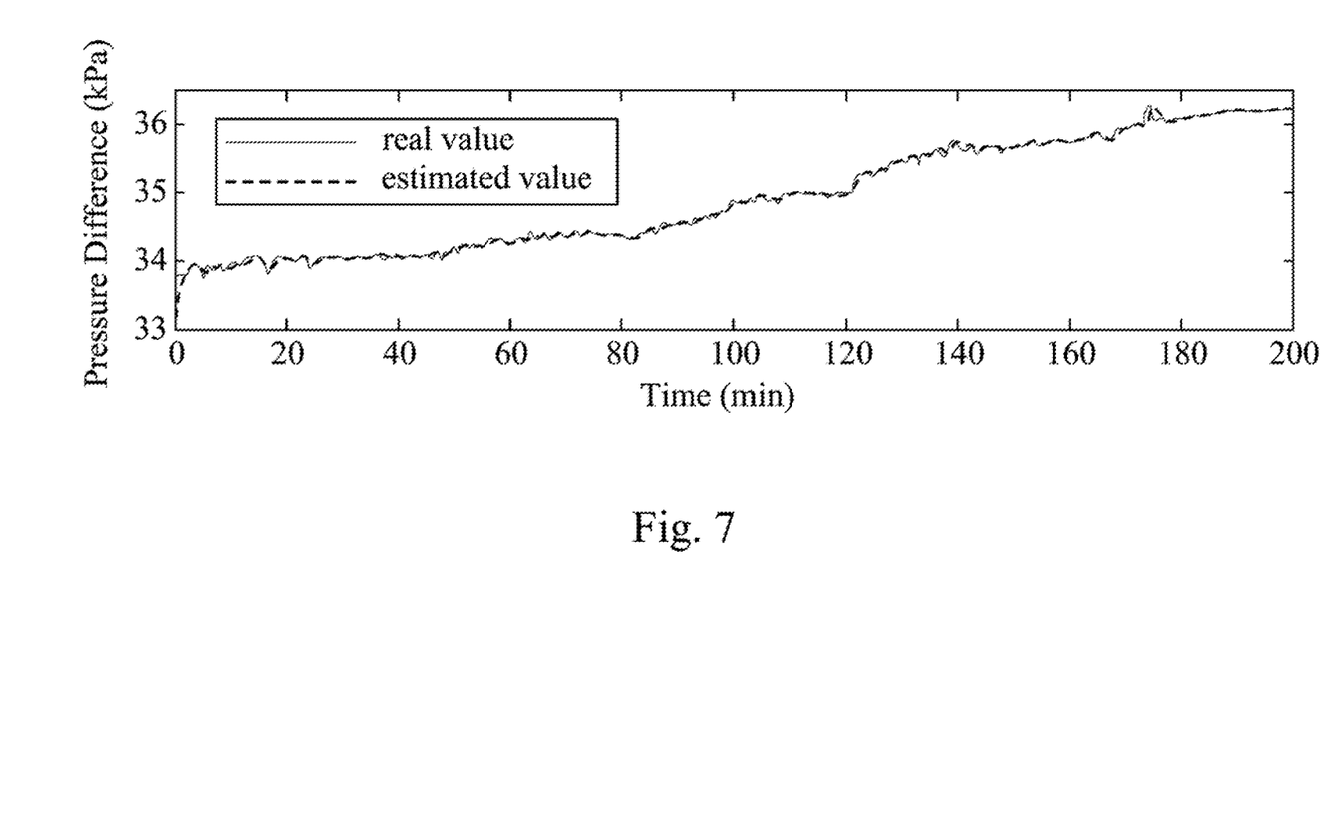
FIG. 7 is a time dependent diagram showing a comparison between an estimated pressure difference and a real pressure difference, under a flow rate 2 l/min and an impurity accumulative quantity 1 to 6 g.
Figure 8:
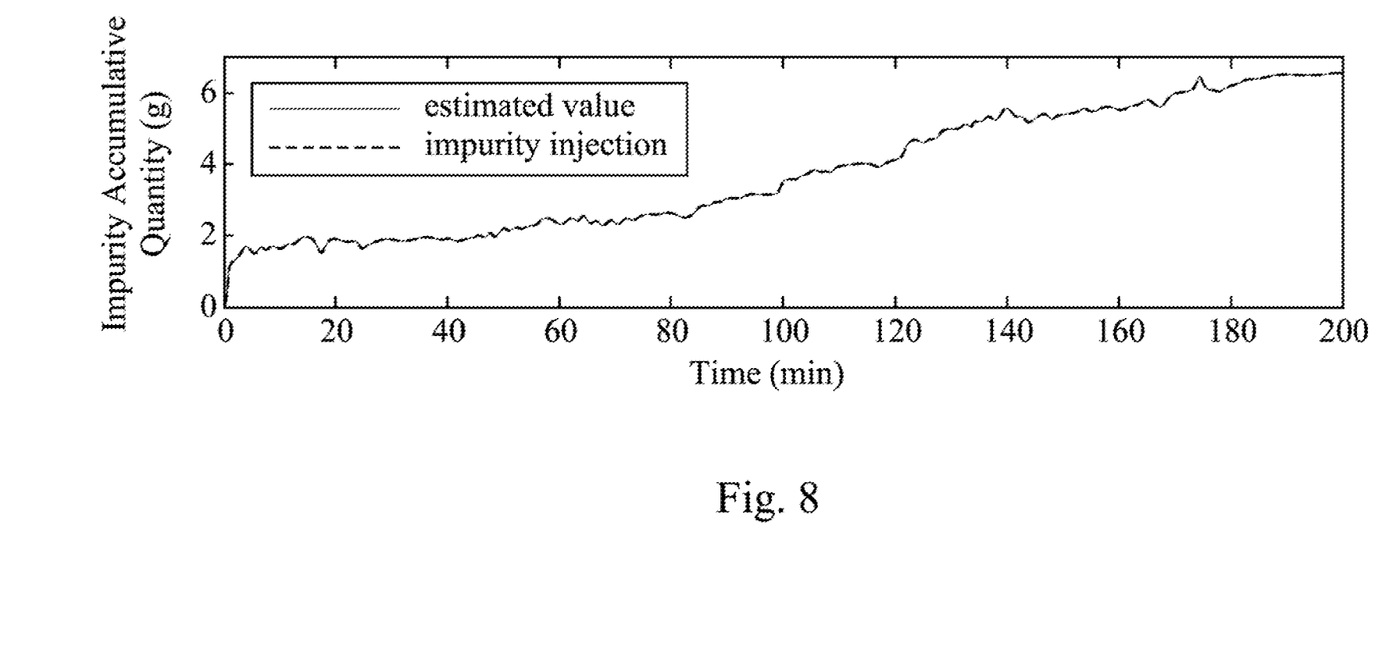
FIG. 8 is a time dependent diagram showing a comparison between an estimated impurity accumulative quantity and a real impurity accumulative quantity under a flow rate 2 l/min and an impurity accumulative quantity 1 to 6 g.
Figure 9:
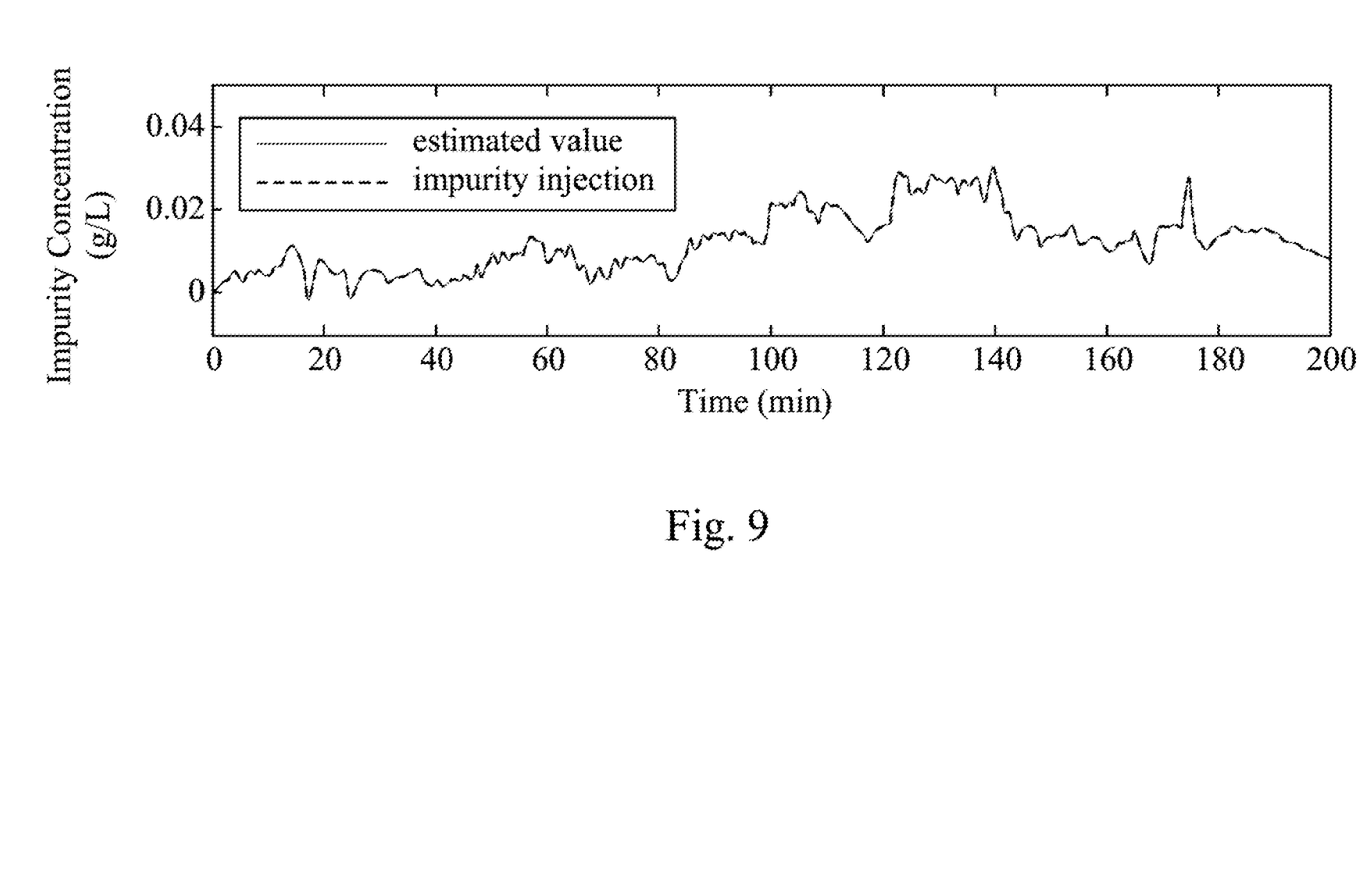
FIG. 9 is a time dependent diagram showing a comparison between an estimated impurity concentration and a real impurity concentration under a flow rate 2 l/min and an impurity accumulative quantity 1 to 6 g.
Figure 10:
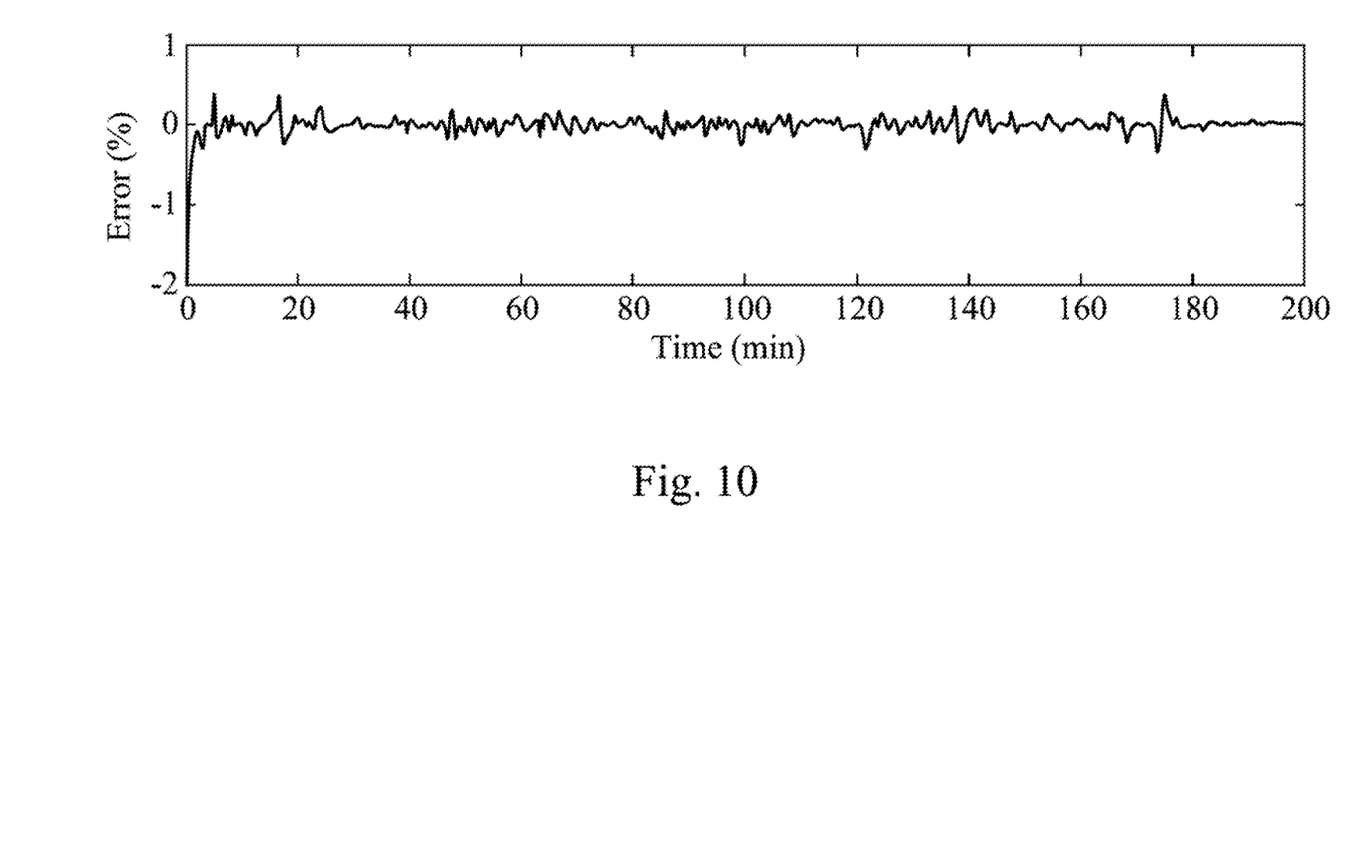
FIG. 10 is a diagram showing an error difference between an estimate impurity accumulative quantity and a real impurity accumulative quantity under a flow rate 2 l/min and an impurity accumulative quantity 1 to 6 g.

FIG. 7 is a time dependent diagram showing a comparison between an estimated pressure difference and a real pressure difference, under a flow rate 2 l/min and an impurity accumulative quantity 1 to 6 g; FIG. 8 is a time dependent diagram showing a comparison between an estimated impurity accumulative quantity and a real impurity accumulative quantity under a flow rate 2 l/min and an impurity accumulative quantity 1 to 6 g; FIG. 9 is a time dependent diagram showing a comparison between an estimated impurity concentration and a real impurity concentration under a flow rate 2 l/min and an impurity accumulative quantity 1 to 6 g; and FIG. 10 is a diagram showing an error difference between an estimate impurity accumulative quantity and a real impurity accumulative quantity under a flow rate 2 l/min and an impurity accumulative quantity 1 to 6 g.

In the present disclosure, the operating model of the fluid filter 100 is combined with the Kalman filter 500 for accurately estimating the time dependent impurity accumulative quantity. For evaluating the accuracy of the method of the present disclosure, impurities from 1 g to 6 g are manually added to simulate the time dependent Impurity accumulative quantity. In FIG. 7, it is shown that the pressure difference is increased with the Impurity accumulative quantity, and is convergent when the impurity quantity is accumulated to 6 g. In FIG. 8, the real value and the estimated value of the time dependent accumulative quantity are fairly matched by using the Kalman filter 500. In FIG. 9, it is shown that the impurity concentration can also be accurately estimated. In FIG. 10, the percentage error between the real value and the estimated value of the time dependent accumulative quantity is within 10% and shows a high accuracy of the method for detecting an abnormality of a fluid filter of the present disclosure.

In sum, the present disclosure provides a method and a system for accurately detecting an abnormality of a fluid filter. Accurate time dependent impurity accumulative quantity can be obtained through combining measuring the flow rate and the pressure difference; constructing the operating model of the fluid filter and estimating the time dependent impurity accumulative quantity by the Kalman filter. The time dependent impurity accumulative quantity is used to determine if the fluid filter needed to be renewed. Therefore, the instability of simply using the pressure difference as the determination criteria of renewing the fluid filter in the conventional arts can be eliminated, thereby increasing the accuracy.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A method for detecting an abnormality of a fluid filter, the method comprising:

detecting a flow rate of a fluid in the fluid filter;
   detecting a pressure difference in the fluid filter;
   constructing an operating model of the fluid filter in accordance with a geometry of the fluid filter, a physical characteristic of the fluid, a porosity of the fluid filter, an impurity density, the flow rate and the pressure difference through an analyzer;
   obtaining an initial impurity accumulative quantity through the operating model constructed by the analyzer;
   estimating a time dependent impurity accumulative status through a Kalman filter in accordance with the initial impurity accumulative quantity and the pressure difference;
   obtaining an impurity accumulative quantity in an estimated time in accordance with the time dependent impurity accumulative status, and then comparing the impurity accumulative quantity with a pre-determined value to determine if the fluid filter operates normally through a processor;
   wherein the operating model of the fluid filter can be represented by the following equation:

$$m = \frac{k_p A^2 \rho_P \Delta P}{\mu Q} - \frac{k_p A \rho_P L_b}{k_b} - \frac{k_p A \rho_P L_f}{k_f};$$

where m is an impurity accumulative quantity, $\Delta P$ is a pressure difference, $\mu$ is a viscosity coefficient of the fluid, Q is a flow rate, A is a cross-sectional area of the fluid filter, $\kappa_b$ is an empty shell porosity, $\kappa_f$ is a filter cartridge porosity, $\kappa_p$ is an impurity porosity, $\rho_p$ is an impurity density, $L_p$ is an empty shell thickness, $L_f$ is a filter cartridge thickness.

2. The method of claim 1, wherein the fluid is a fuel oil, an engine oil or an automatic transmission oil.

3. The method of claim 1, wherein the pressure difference is a pressure difference between a fluid inlet and a fluid outlet of the fluid filter.

4. The method of claim 3, wherein the pressure difference comprises an empty shell pressure difference, a filter cartridge pressure difference and an impurity pressure difference.

5. The method of claim 1, wherein when the operation of the fluid filter is determined as abnormal, a warning sound, a warning light or a warning message is generated.

6. The method of claim 1, wherein the empty shell porosity can be obtained through performing a quadratic regression analysis to a plurality of flow rates of the fluid.

* * * * *